(12) United States Patent
Diosi et al.

(10) Patent No.: US 7,971,500 B2
(45) Date of Patent: Jul. 5, 2011

(54) SHEET METAL CYLINDER WITH A SYNCHRONIZATION PROFILE

(75) Inventors: Gabor Diosi, Friedrichshafen (DE); Josef Haupt, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 561 days.

(21) Appl. No.: 12/048,502

(22) Filed: Mar. 14, 2008

(65) Prior Publication Data

US 2008/0229855 A1 Sep. 25, 2008

(30) Foreign Application Priority Data

Mar. 23, 2007 (DE) .......................... 10 2007 013 930

(51) Int. Cl.
*F16H 55/17* (2006.01)
(52) U.S. Cl. ........................................ 74/434; 192/70.2
(58) Field of Classification Search .................. 192/70.2, 192/70.12; 74/434
See application file for complete search history.

(56) References Cited

U.S. PATENT DOCUMENTS

| 4,089,097 A | * | 5/1978 | Good et al. | ................. 29/896.6 |
| 4,945,782 A | * | 8/1990 | Farrell | ............. 74/431 |
| 5,570,767 A | * | 11/1996 | Lauscher | .................. 192/70.12 |
| 5,996,757 A | | 12/1999 | Hofmann et al. | |
| 6,047,803 A | | 4/2000 | Pinschmidt et al. | |
| 6,058,591 A | * | 5/2000 | Prater | ............. 29/558 |
| 6,142,276 A | | 11/2000 | Pinschmidt et al. | |
| 7,124,869 B2 | | 10/2006 | Hoebel et al. | |
| 2004/0112708 A1 | | 6/2004 | Friedrich et al. | |
| 2008/0006503 A1 | | 1/2008 | Diosi et al. | |

FOREIGN PATENT DOCUMENTS

| DE | 197 38 596 C1 | 11/1998 |
| DE | 198 27 339 A1 | 12/1999 |
| DE | 198 27 340 C1 | 12/1999 |
| DE | 103 19 703 B3 | 11/2004 |
| DE | 10 2004 049 144 A1 | 4/2006 |
| DE | 10 2006 031 788 A1 | 1/2008 |
| EP | 1 400 714 A2 | 3/2004 |

* cited by examiner

*Primary Examiner* — Justin Holmes
(74) *Attorney, Agent, or Firm* — Davis & Bujold, P.L.L.C.

(57) ABSTRACT

A sheet metal cylinder (1) with an axis of rotation (a) and a synchronization profile extending in axial direction (a), which can be manufactured by sheet metal shaping. The synchronization profile (4, 5) has a circumferential supporting element (6) located along its axial length (a).

13 Claims, 4 Drawing Sheets

SHEET METAL CYLINDER WITH A SYNCHRONIZATION PROFILE

This application claims priority from German Application Serial No. 10 2007 013 930.8 filed Mar. 23, 2007.

FIELD OF THE INVENTION

The present invention relates to a sheet metal cylinder with an axis of rotation and a synchronization profile that extends in the axial direction.

BACKGROUND OF THE INVENTION

Sheet metal cylinders with a synchronization profile are known in particular as disk carriers for the accommodation of gearshift elements. Disk carriers of this type are manufactured by (non-cutting) shaping of a sheet metal part, preferably made of steel, into which the synchronization profile is rolled in. The synchronization profile is usually configured in trapezoidal, cross-sectional shape and meshes with the disks, normally the external disks, of one or more shift elements. The synchronization profile, which extends over the entire axial length of the disk carrier, creates a relatively soft accordion-like shape, which tends to deform in the tangential and radial direction at high speeds and under the effect of centrifugal forces. Particularly in disk carriers and/or cylinders with large axial lengths, there is an increased risk of improper deformation of the cylinder, for example, when accommodating two shift elements and/or two related disk carriers.

DE 10 2006 031 788.2 of the Applicant shows a cylinder with a relatively large axial length designed as an external disk carrier.

The task of the present invention is to configure a sheet metal cylinder of the above-mentioned type in a cost-effective manner so that increased stiffness is achieved, especially under the effect of centrifugal forces.

SUMMARY OF THE INVENTION

According to the present invention, it is provided that the synchronization profile is discontinued in the axial direction and replaced with a circumferential supporting element. The supporting element is preferably at least configured as an axial segment, which has no, or only a "flattened", synchronization profile. Especially preferred is an axial segment having a flat, i.e., a non-profiled, annular cross-section of the same thickness as the sheet metal material. The advantage is thereby achieved that the tensile load in the tangential direction can be absorbed and deformation of the synchronization profile is no longer possible. The supporting element and/or axial segment, according to the present invention, acts as an integrated binding and thus has a stabilizing supporting effect on the entire cylinder. It is also advantageous that the non-profiled axial segment may be manufactured by conventional sheet metal shaping, i.e., basically the same equipment which is employed for the metal shaping process may be used.

The non-profiled axial segment is preferably arranged in the central axial area of the cylinder because the highest strain occurs at that point.

According to a further preferred embodiment, a non-profiled axial segment may also be arranged at the front side in order to prevent improper deformation of the cylinder in this area as well.

According to the present invention, the cylinder is very preferentially used as a disk carrier to accommodate shift elements with disk sets for a gearbox. In particular, the arrangement of two shift elements and/or disk sets in the disk carrier results in an increased axial length, which may be stiffened advantageously by way of a centrally arranged supporting element.

BRIEF DESCRIPTION OF THE DRAWINGS

The invention will now be described, by way of example, with reference to the accompanying drawings in which.

DETAILED DESCRIPTION OF THE INVENTION

Figure 1:
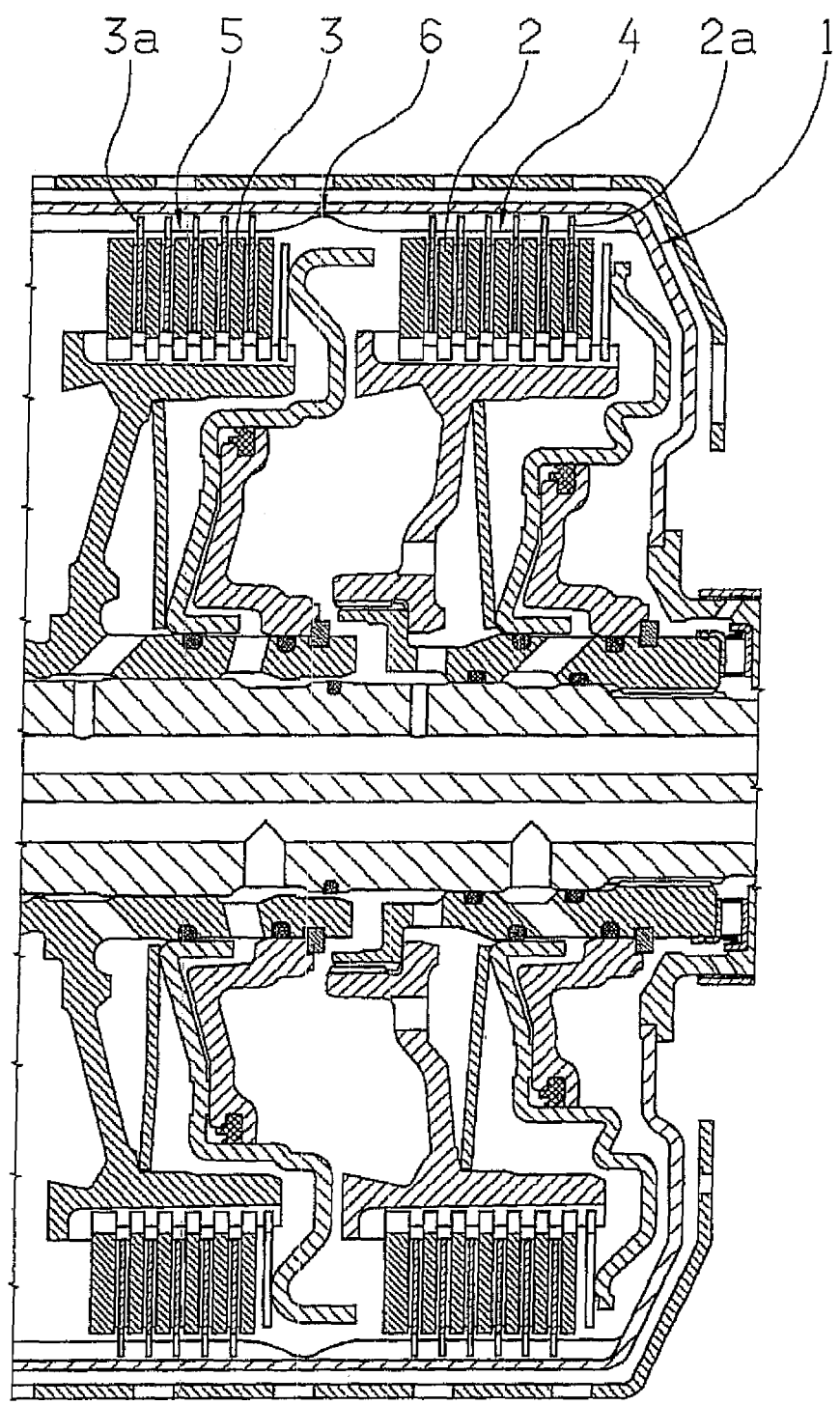
FIG. 1 is a section of an automatic gearbox with a disk carrier and shift elements.

FIG. 1 shows a section of an automatic gearbox for a motor vehicle with a steel metal cylinder 1, which is configured as an external disk carrier and accommodates two shift elements 2, 3 inside. The shift elements 2, 3 each have disk sets with external disks 2a, 3a, which mesh with the synchronization profiles 4, 5 of the disk carrier 1. Both synchronization profiles 4, 5 are discontinued between both shift elements 2, 3 and separated by a supporting element 6, which is configured as a non-profiled axial segment. The disk carrier 1 with the supporting element 6 will be explained in more detail below.

Figure 2:
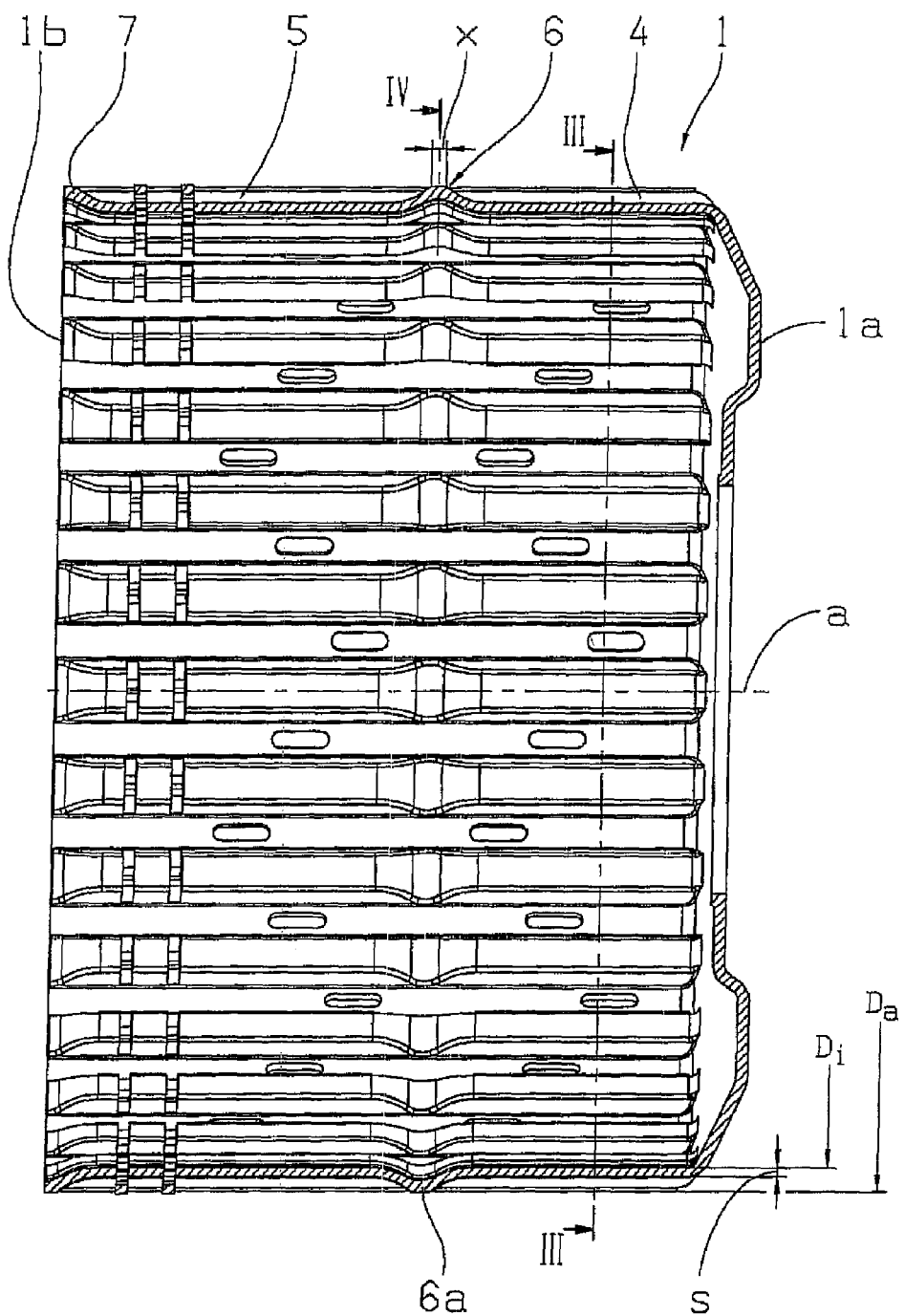
FIG. 2 is an axial section of the disk carrier as an individual part.

FIG. 2 shows an axial section of the disk carrier 1 as an individual part. The disk carrier 1 is configured as a steel metal cylinder, which is manufactured in one piece from a sheet metal plate by sheet metal shaping. The axis of rotation of the cylinder 1 is designated with "a". Positioned between both profiled sections 4, 5, extending in the axial direction also called the synchronization profile is the axial segment 6, which has no synchronization profile, but an annular cross-section 6a and it is located approximately in the center of the axial length of the cylinder 1, annular cross section 6a, which passes continuously into the synchronization profiles 4, 5 on both sides. The disk carrier 1 shaped as a pot with a bottom 1a as well as an open front side 1b. A profile-less section 7 is arranged at the front side 1b. The annular cross-section of the non-profiled axial segment 6 extends over a length x, which is designed for heavy duty operation as expected when operating the disk carrier 1 at high speed. The external diameter of the disk carrier 1 is designated with $D_a$ and the internal diameter (bottom of the synchronization profile 4, 5) is designated with $D_i$. The axial segment 6 likewise has an external diameter $D_a$ and is aligned with the external contour of the disk carrier 1. The internal diameter of the axial segment 6 is $D_a-2s$, where s is the sheet metal thickness of the disk carrier 1.

Figure 3:
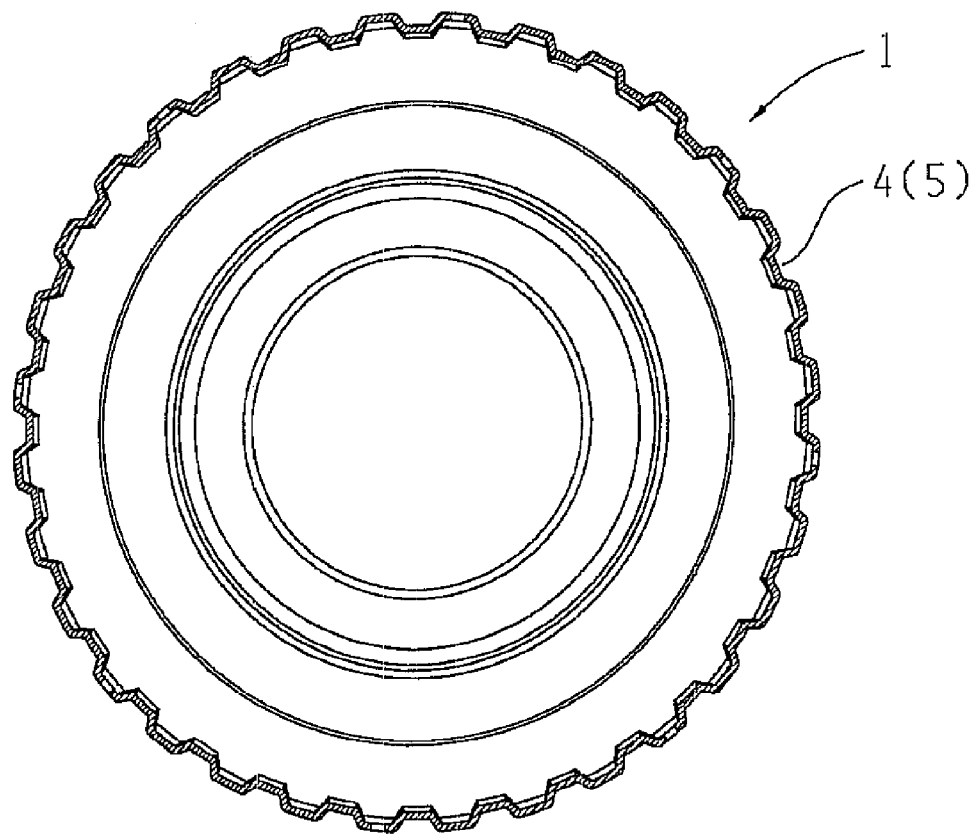
FIG. 3 is a radial section of the disk carrier.

FIG. 3 shows a radial section along line in FIG. 2, i.e., across the profile section 4, where the synchronization profile 5 is configured in the same way. It is apparent that the synchronization profile 4 (and also the synchronization profile 5) is configured in a trapezoidal shape, which fashioned into the cylinder 1 by sheet metal shaping.

Figure 4:
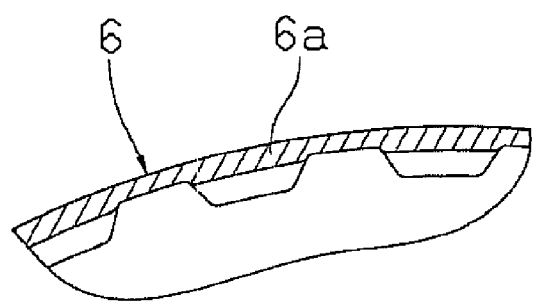
FIG. 4 is a partial section of an axial segment without profile.

FIG. 4 shows a partial section along line IV-IV in FIG. 2, i.e., across the supporting element configured as an axial segment 6. The continuous annular cross-section 6a, i.e., which extends around the entire circumference of the axial segment 6 is clearly visible.

Figure 5:
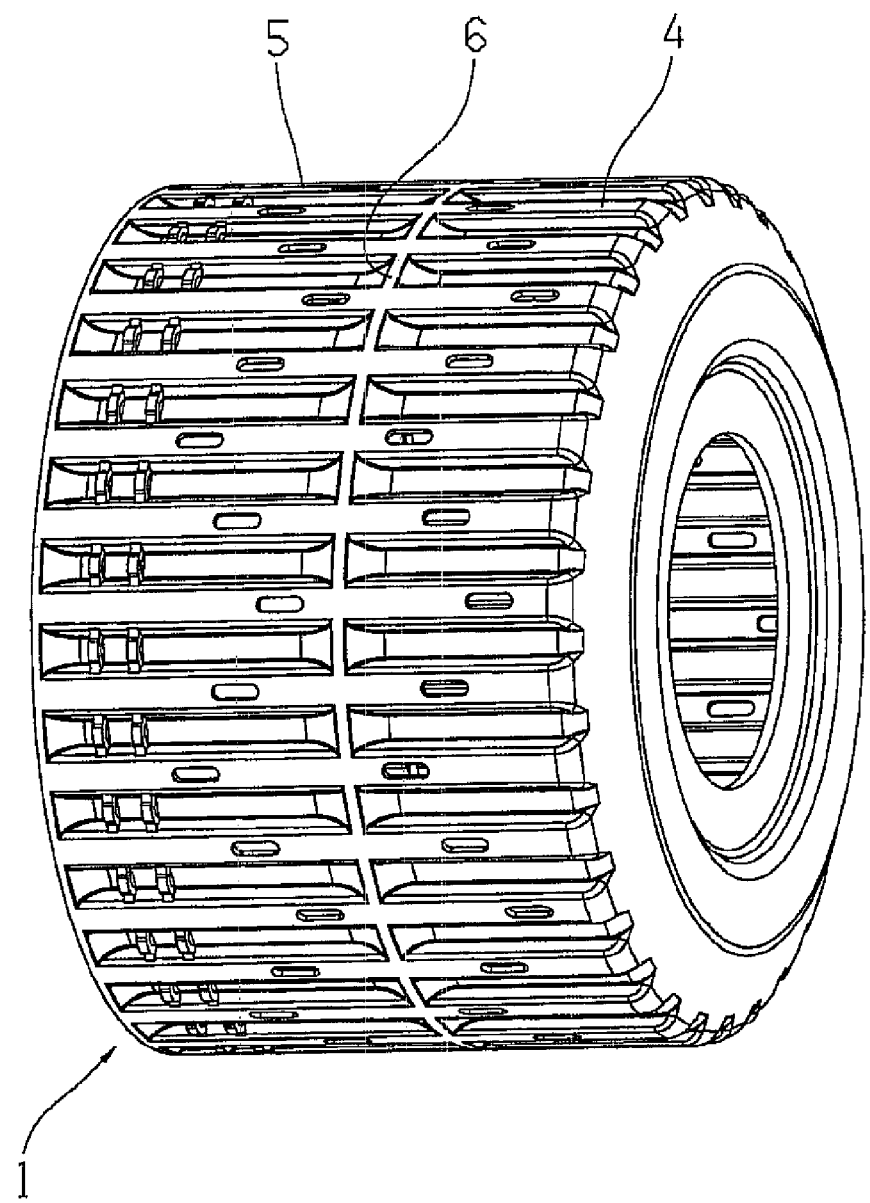
FIG. 5 is a view of the disk carrier in perspective.

FIG. 5 shows a perspective illustration of the disk carrier 1, where the axial segment 6 is clearly visible in the central area, which extends, albeit configured in one piece with the steel metal cylinder 1, like a binding around the entire circumference. In this area, the high operational strain, occurring at high speeds as tangential forces and/or tensile stress, are absorbed in the tangential direction so that the adjacent profile sections 4, 5 are relieved and their profile, according to FIG. 3, is also maintained at high speeds.

REFERENCE NUMERALS 1 disk carrier/cylinder
1a bottom
1b front side
2 shift element
2a external disk
3 shift element
3a external disk
4 synchronization profile
5 synchronization profile
6 supporting element, central
6a annular cross-section
7 supporting element, front side
$D_a$ external diameter
$D_i$ internal diameter
s sheet metal thickness
a axis of rotation
x length

The invention claimed is:

1. A sheet metal cylinder (1) with an axis of rotation (a) and a synchronization profile extending in an axial direction (a) which is manufactured by shaping sheet metal,
   wherein the synchronization profile (4, 5) is discontinued in an axial direction in a supporting element region of a profile flank of the synchronization profile (4, 5) and transitions, in the supporting element region, into a circumferential supporting element (6) which is an axial segment of the profile flank without any synchronization profile (4, 5), the circumferential supporting element has a continuously exterior curved axial profile that is continuous with the synchronization profile so that the circumferential supporting element (6) facilitates absorbing operational strain, which extends in a tangential direction, during rotation of the sheet metal cylinder (1), an external diameter (Da) of the circumferential supporting element (6) is equal to an external diameter (Da) of the synchronization profile (4, 5) so the central area of the sheet metal cylinder (1) forms a constant diameter annular ring which extends normal to the axis of rotation (a) of the sheet metal cylinder (1), and a thickness of the circumferential supporting element (6) is equal to a thickness of the sheet metal from which the sheet metal cylinder (1) is manufactured.

2. The sheet metal cylinder according to claim 1, wherein the sheet metal cylinder has an external diameter ($D_a$) and an axial segment of the circumferential supporting element (6) has an annular cross-section (6a) with the external diameter ($D_a$).

3. The sheet metal cylinder according to claim 1, wherein the circumferential supporting element (6) is arranged in a central area oriented along the axial direction (a).

4. The sheet metal cylinder according to claim 1, wherein a further supporting element (7) is arranged at a front side of the sheet metal cylinder.

5. The sheet metal cylinder according to claim 1, wherein the synchronization profile (4, 5) is a trapezoidal shape.

6. The sheet metal cylinder according to claim 1, wherein the synchronization profile (4, 5) terminates and transitions, at a leading end of the sheet metal cylinder (1), into a cylindrical leading further supporting element (7) without any synchronization profile (4, 5); and
   an external diameter ($D_a$) of the leading further supporting element (7) is equal to the external diameter ($D_a$) of the synchronization profile (4, 5) so the leading further supporting element (7) of the sheet metal cylinder (1) forms a constant diameter annular ring which extends normal to the axis of rotation (a) of the sheet metal cylinder (1), and a thickness of the leading further supporting element (7) is equal to a thickness of the sheet metal from which the sheet metal cylinder (1) is manufactured.

7. The sheet metal cylinder according to claim 1, wherein an internal diameter of the axial segment of the circumferential supporting element (6) is equal to the external diameter ($D_a$) minus twice a thickness of the sheet metal cylinder ($D_a$−2s) and a height of a first section of the synchronization profile (4) decreases as the first section of the synchronization profile (4) transitions into the circumferential supporting element (6) and a height of a second section of the second synchronization profile (5) decreases as the second section of the synchronization profile (5) transitions into the circumferential supporting element (6).

8. A cylindrical sheet metal carrier (1) for rotationally supporting gearshift elements, wherein the cylindrical sheet metal carrier (1) rotates about a rotational axis (a) and has an axial length, the cylindrical sheet metal carrier (1) is formed from a metal sheet to have a synchronization profile extending in an axial direction along the axial length with the synchronization profile being defined by a circular crenulated cross-sectional profile (4, 5) with a series of alternating ridges and grooves that axially extend along a majority of the axial length, at least one axial segment of the cylindrical sheet metal carrier (1), along the axial length of the cylindrical sheet metal carrier (1), being a circumferential supporting element having a smooth annular cross-sectional profile (6) without any alternating ridges and grooves and a continuously curved exterior axial profile that is continuous with the synchronization profile so that the smooth annular cross-sectional profile (6) facilitates absorbing operational strain, which extends in a tangential direction, during rotation of the cylindrical sheet metal carrier (1), an external diameter (Da) of the circumferential supporting element (6) is equal to an external diameter (Da) of the synchronization profile (4, 5) so the central area of the cylindrical sheet metal carrier (1) forms a constant diameter annular ring which extends normal to the axis of rotation (a) of the sheet metal carrier (1), and a thickness of the circumferential supporting element (6) is equal to a thickness of the sheet metal from which the cylindrical sheet metal carrier (1) is manufactured.

9. The cylindrical sheet metal carrier (1) according to claim 8, wherein the synchronization profile (4, 5) terminates and transitions, at a leading end of the cylindrical sheet metal carrier (1), into a cylindrical leading further supporting element (7) without any synchronization profile (4, 5); and
   an external diameter ($D_a$) of the leading further supporting element (7) is equal to the external diameter ($D_a$) of the synchronization profile (4, 5) so the leading further supporting element (7) of the cylindrical sheet metal carrier (1) forms a constant diameter annular ring which extends normal to the axis of rotation (a) of the cylindrical sheet metal carrier (1) and a thickness of the leading further supporting element (7) is equal to a thickness of the sheet metal from which the sheet metal cylinder (1) is manufactured.

10. The cylindrical sheet metal carrier (1) according to claim 8, wherein an internal diameter of the axial segment of the circumferential supporting element (6) is equal to the external diameter ($D_a$) minus twice a thickness of the cylindrical sheet metal carrier (1) ($D_a-2s$) and a height of a first section of the synchronization profile (4) decreases as the first section of the synchronization profile (4) transitions into the circumferential supporting element (6) and a height of a second section of the second synchronization profile (5) decreases as the second section of the synchronization profile (5) transitions into the circumferential supporting element (6).

11. A disk carrier manufactured as sheet metal cylinder (1) having an axis of rotation (a), the sheet metal cylinder (1) being manufactured by shaping of sheet metal and comprising first and second adjacent synchronization profiles (4, 5) for supporting disks, each of the first and the second of adjacent synchronization profiles (4, 5) extending in an axial direction (a) and being separated from one another by an axial segment of a circumferential supporting element (6);

wherein a disk supporting profile of the first and the second synchronization profiles (4, 5) each terminate and transition into, in a central area of the sheet metal cylinder (1), a cylindrical axial segment of the circumferential supporting element (6) without any synchronization profile (4, 5);

an external diameter ($D_a$) of the axial segment of the circumferential supporting element (6) is equal to an external diameter ($D_a$) of the first and the second synchronization profiles (4, 5) so the central area of the sheet metal cylinder (1) forms a constant diameter annular ring which extends normal to the axis of rotation (a) of the sheet metal cylinder (1), and a thickness of the axial segment of the circumferential supporting element (6) is equal to a thickness of the sheet metal from which the sheet metal cylinder (1) is manufactured so that the axial segment (6) facilitates absorbing operational strain, which extends in a tangential direction, during rotation of the disk carrier.

12. The disk carrier manufactured as the sheet metal cylinder (1) according to claim 11, wherein one of the first and the second synchronization profiles (4, 5) terminates and transitions, at a leading end of the sheet metal cylinder (1), into a cylindrical leading further supporting element (7) without any synchronization profile (4, 5); and an external diameter ($D_a$) and the leading further supporting element (7) is equal to an external diameter ($D_a$) of the first and the second synchronization profiles (4, 5) so the leading further supporting element (7) of the sheet metal cylinder (1) forms a constant diameter annular ring which extends normal to the axis of rotation (a) of the sheet metal cylinder (1), and a thickness of the leading further supporting element (7) is equal to a thickness of the sheet metal from which the sheet metal cylinder (1) is manufactured.

13. The disk carrier manufactured as the sheet metal cylinder (1) according to claim 11, wherein each of the first and the second synchronization profiles (4, 5) have is a trapezoidal shape and a height of the first synchronization profile (4) decreases as the first synchronization profile (4) transitions into the circumferential supporting element (6) and a height of the second synchronization profile (5) decreases as the second synchronization profile (5) transitions into the circumferential supporting element (6).

* * * * *